United States Patent [19]

Friedman

[11] Patent Number: 5,734,495
[45] Date of Patent: Mar. 31, 1998

[54] PASSIVE CONTROL OF EMISSIVITY, COLOR AND CAMOUFLAGE

[75] Inventor: Melvin H. Friedman, Alexandria, Va.

[73] Assignee: The United States of America as represented by the Secretary of the Army, Washington, D.C.

[21] Appl. No.: 535,855

[22] Filed: Sep. 28, 1995

[51] Int. Cl.⁶ .............. G02B 26/02; E04H 15/00; G09F 19/14
[52] U.S. Cl. .............. 359/350; 359/613; 359/896; 359/900; 428/919; 472/72; 135/901; 40/453
[58] Field of Search .............. 43/1; 428/919; 135/901; 359/233, 350, 601, 613, 896, 900; 40/453, 476, 489, 490, 491; 472/71, 72, 77

[56] References Cited

U.S. PATENT DOCUMENTS 2,186,203  1/1940  Centeno .............. 359/233
4,611,524  9/1986  Ferris .............. 428/919
5,012,080  4/1991  Griscom .............. 359/613
5,077,101  12/1991  Conway et al. .............. 428/17

*Primary Examiner*—Paul M. Dzierzynski
*Assistant Examiner*—John Juba, Jr.
*Attorney, Agent, or Firm*—Milton W. Lee; John E. Holford; Alain L. Bashore

[57] ABSTRACT

A device and technique for the passive real-time control of effective emissivity, color, and camouflage, the device utilizing surfaces which are interposed between a target and an observer at a viewing position with a predetermined angular resolution. Effective surfaces are utilized, including at least one set of movable surfaces, the effected surfaces having a predetermined surface characteristic, such as emissivity, color, or camouflage pattern. An assembly contains all surfaces relative to each other such that the front and back surfaces are seen by the viewing position as stationary. A drive assembly allows movable surfaces to move.

18 Claims, 9 Drawing Sheets

PASSIVE CONTROL OF EMISSIVITY, COLOR AND CAMOUFLAGE

BACKGROUND OF THE INVENTION

1. Field of the Invention

The present invention generally relates to surface modification devices and techniques, and more specifically to the passive control of emissivity, color and camouflage.

2. Description of Prior Art

Countermeasures to both visible and thermal sensors, such as camouflage and target signature reduction, have been of great importance in the modern battlefield. One typical infrared (IR) camouflage technique involves covering an object with a material cover, with or without environmentally controlled subsystems (having added extraordinary power requirements). Much effort has been expended in the determination of the materials to be used to comprise the typical IR camouflage covering. One example in the IR camouflage prior art may be found in U.S. Pat. No. 4,156,033 to Earl F. Bienz issued on 22 May 1979. In the Bienz patent there is disclosed applying appropriate foam layers to a tank, so as to mask its thermal signature. In the visible and also in the infrared, these approaches have had limited success.

In the infrared, some factors for the aforementioned limited success includes the following:

a. camouflage material has different heat transfer characteristics from the background resulting in changing apparent temperature differences between the target and the background over a diurnal cycle, b. camouflage net material is vented to prevent heat build up but winds cause the material to move which effects a blinking IR beacon, c. one observer seeing an object against a hot background (such as the ground) and a second observer seeing the same object against a cold background (such as the sky), allows for a situation where the current state of the art does not permit the object to simultaneously be made to appear hotter to the first observer and colder to the second observer, and d. when either the surface and/or the observer moves, the apparent temperature and spatial pattern of the background against which the surface is seen appears to change, thus clearly showing a target.

In the visible, limited success has also resulted from factors including the following:

a. camouflage patterns painted on a conventional surface are unable to change and a fixed camouflage pattern is inappropriate for the variety of backgrounds encountered in nature, b. one observer sees a military target against a rocky background while another observer sees the target against a forested background while a third observer sees the target against a red barn. The current state of the art does not allow the military target to be effectively camouflaged for all these observers in real time, and c. when either the military target or the observer move, the background against which the target is seen changes reducing the effectiveness of the camouflage pattern.

Modeling of camouflage effectiveness is an area undergoing rapid development, where current modeling methodologies consider both the infrared and visible spectrum. Finding targets in the infrared requires target size and apparent temperature difference between the target and the background (known as ΔT), a summary measure that combines target background physical temperature difference and target-background emissivity difference. As current IR sensor technology (of which the sensors are commonly called forward-looking infrared (FLIR) sensors) matures, sensors which respond to apparent temperature difference will be replaced by multi-band radiometers and hyper-spectral line scanners capable of generating contrasts which can separate these two effects; i.e. they can generate a contrast based on the physical temperature differences between the target and the background and a separate contrast based on emissivity differences between the target and the background. Making targets hard to find in the visible is primarily concerned with the development of ever more effective camouflage patterns and with techniques for characterizing the effectiveness of the camouflage for particular terrain.

While the prior art has reported using surface modification devices and techniques, none have established a basis for a specific apparatus and technique dedicated to the task of resolving the particular problem at hand. What is needed in this instance is a passive real-time control of: 1)the effective emissivity (band averaged or spectral) in the thermal wavelength region, 2) apparent color in the visible wavelength region, and 3) camouflage patterns for both thermal and visible wavelength regions.

SUMMARY OF THE INVENTION

In the infrared it is therefore one object of the invention to provide a passive real-time control of effective emissivity, in the thermal wavelength region, apparent color in the visible wavelength region, and camouflage patterns for both thermal and visible wavelength regions.

According to the invention, a technique and device is disclosed for the passive real-time control of effective emissivity, color, and camouflage. The technique utilizes effected surfaces which are interposed between a target and an observer's viewing position having a predetermined angular resolution. Effective dimensions for all effected surfaces are determined, where all surfaces are interposed substantially between the target and the observer's viewing position. A critical range is then determined, as a range beyond which there is no resolution of individual surfaces at the observer's viewing position. Surface emissivities and colors are then determined for each surface. All effected surfaces relative to each other are contained (as an assembly) such that at least one effected surface is relatively stationary, and at least one effected surface is movable relative to each other in a predetermined rate. The number of assemblies is also determined. The invention results in achieving, beyond a critical range by positioning the determined number of assemblies, the passive control of effective emissivity of the viewable surface in a thermal wavelength region, apparent color of the viewable surface in the visible wavelength region, and camouflage patterns for both thermal and visible wavelength regions.

BRIEF DESCRIPTION OF THE DRAWINGS

The foregoing and other objects, aspects and advantages will be better understood from the following detailed description of a preferred embodiment of the invention with reference to the drawings, in which.

FIG.s 8a, 8b, and 8c are front views of the various movement means utilized in the second embodiment of the invention.

DETAILED DESCRIPTION OF A PREFERRED EMBODIMENT OF THE INVENTION

Given a predetermined thermal imager known in the prior art by a minimum resolvable temperature difference (MRT) disclosed in the prior art reference "NVEOD FLIR92 Thermal imaging Systems Performance Model" by Scott et al (SPIE; Vol. 1689; Infrared Imaging Systems; 23–24 Apr. 1992; pp.194–203) and a predetermined target with parameters as disclosed in the prior art reference "Standard Night Vision Thermal Modeling Parameters" by Friedman et al (SPIE; Vol. 1689; Infrared Imaging Systems; 23–24 Apr. 1992; pp.204–212), and utilizing the prior art ACQUIRE model, there results in a reduction in the probability of detection versus range by the present invention.

For an opaque object, reflectivity and emissivity sum to one, which is utilized by the present invention to control band averaged reflectivity and spectral reflectivity in the infrared wavelength region. Two surfaces (denoted as surfaces 1 and 2) at a common temperature T are each described as having areas and emissivities: $A1,\epsilon1$ and $A2,\epsilon2$ respectively, and are viewed by either a staring or scanning thermal imager. At a critical range R0 the areas A1 and A2 are barely resolved. For ranges greater than R0, the thermal imager cannot resolve the individual areas and so the surface will appear to have a single emissivity $\epsilon$ given by:

$$\epsilon = \{\epsilon1(A1/A2) + \epsilon2\}/\{(A1/A2) + 1\} \quad (1)$$

If A1/A2 is small then the total surface will appear to have an emissivity close to $\epsilon2$; if A1/A2 is large then the total surface will appear to have a emissivity close to $\epsilon1$. In the first embodiment of the invention the emissivity $\epsilon$ is controlled by mechanically varying the ratio A1/A2.

Figure 1A:
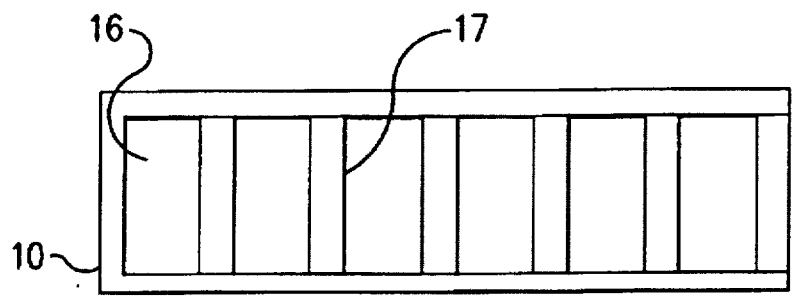
FIG. 1a is a front view of the stationary front apertured faceplate of the first embodiment of the invention.
Figure 1B:
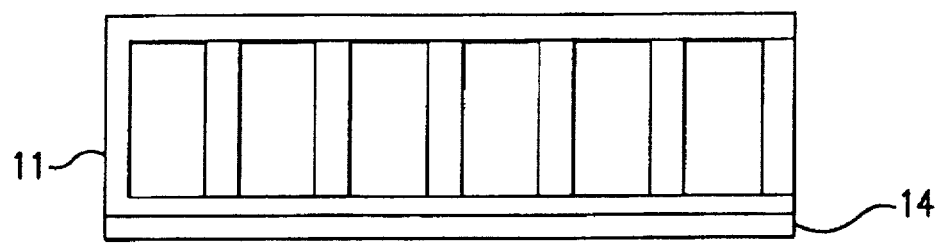
FIGs. 1b, 1c and 1d are front views of the movable apertured plate elements utilized in the first embodiment of the invention.
Figure 1C:
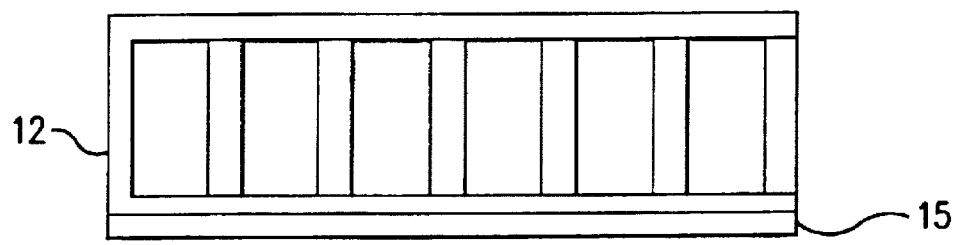
Figure 1D:
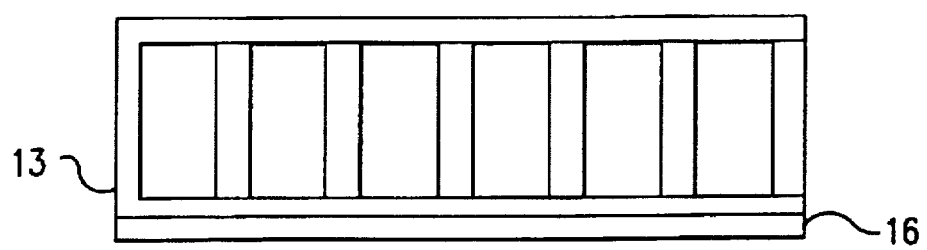
Figure 2:
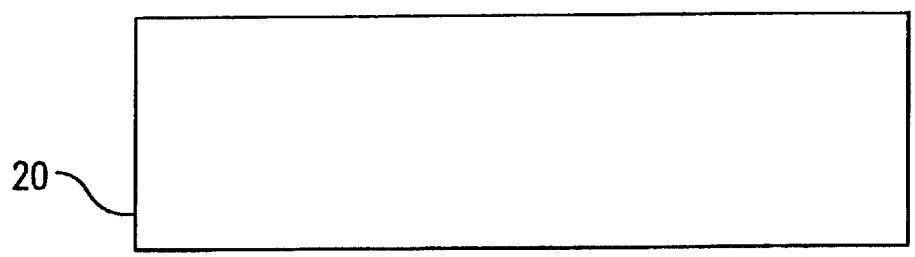
FIG. 2 is a front view of the back stationary plate element utilized in the first embodiment of the invention.

Referring now to the drawings, and more particularly to FIG. 1a there is shown a front view of stationary front apertured plate 10, and for FIG.s 1b, 1c, and 1d there is shown the first, second and third movable apertured plates, 11, 12, and 13 respectfully. Each of plates 11, 12 and 13 have integral to each base respective hollowed track portions 14, 15, and 16 respectfully to provide access for movement means. For the control of band averaged emissivity, plates 11, 12 and 13 are made with a material of emissivity $\epsilon1$, while solid back plate 14 of FIG. 2 is made from a material with emissivity $\epsilon2$. Stationary apertured plate 10 is either made from a material with emissivity $\epsilon1$ or $\epsilon2$. For the apertured plates, there is a relationship between the width of the aperture (such as aperture 16 of FIG. 1a, the width of the masking column (such as masking column 17 of FIG. 1a) and the number of moving plates m:

$$m \geq w_a/w_m$$

where m is the number of moving plates, $w_a$ is the width of an aperture, and $w_m$ is the width of the masking column. Increasing m allows the emissivity to be controlled over a larger range at a cost of increasing complexity. The parameter $w_a$ and the instantaneous field of view (IFOV), of a thermal viewing device projected at $w_m$ determines a critical range $R_0$:

$$R_0 = w_a/\theta$$

where $\theta$ is the angular resolution (which is considered for the purposes of this invention as nominally the IFOV) and $R_0$ is the critical range. Since it is desirable to work at ranges greater than $R_0$, it is therefore desirable for $w_a$ to be as small as practicable. The relative movements thereof, specific material coatings, aperture size and column widths (of the apertured plates) allows for a passive real-time control of effective emissivity, in the thermal wavelength region, apparent color in the visible wavelength region, and camouflage patterns for both thermal and visible wavelength regions.

Figure 3:
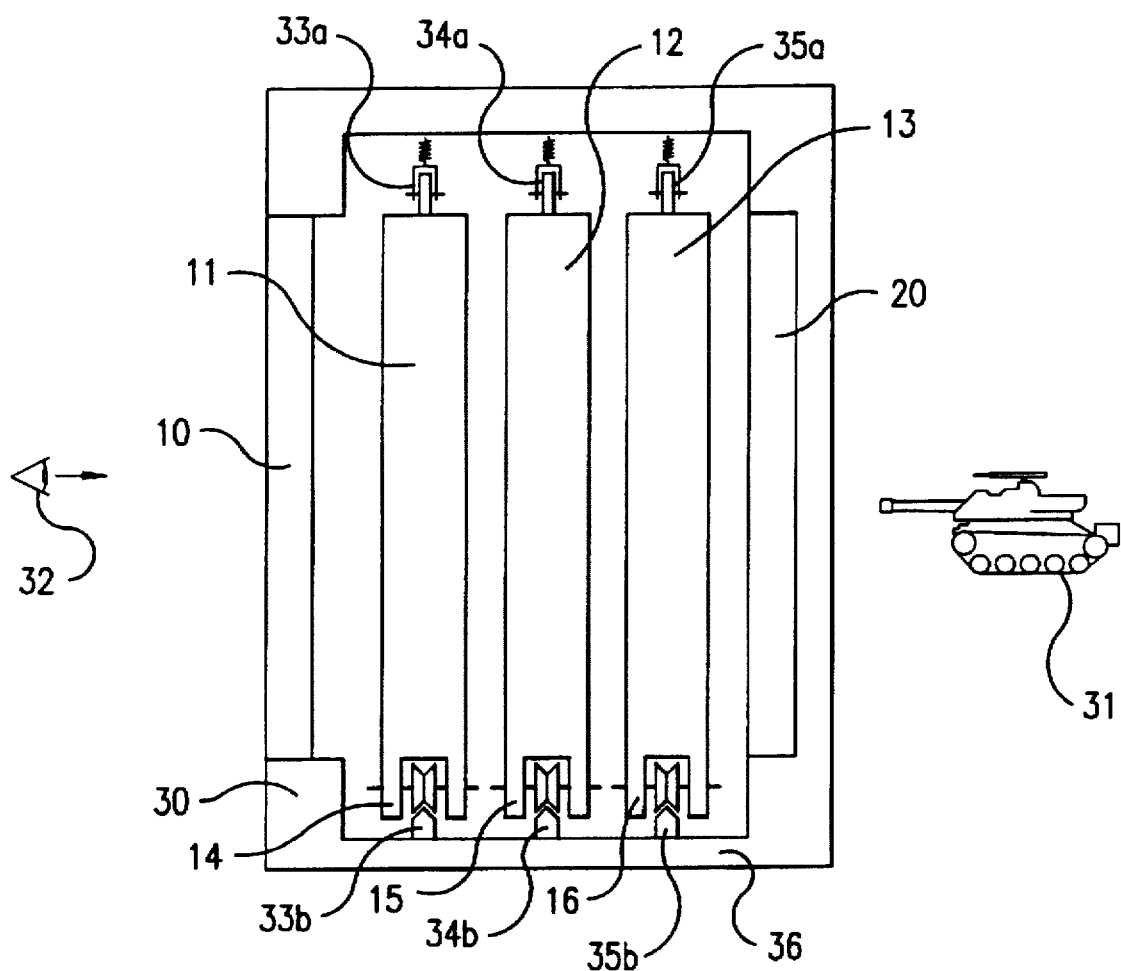
FIG. 3 is a side view of the housing utilizing the plate elements of FIG.s 1a, 1b, 1c, 1d, and 2 as the device for the first embodiment of the invention.

The device of FIG. 3, shown as a side view, consists of stationary faceplate 10, the set of three movable plates 11, 12, and 13 (all initially behind face plate 10) and back plate 20, of FIG.s 1a, 1b, 1c, 1d, and 2. All plate elements are accommodated within framework assembly 30. The device of the present invention is positioned in front of and approximately parallel to any object (or area) such as target 31, while the observed line of sight 32 is approximately perpendicular, and in front of, the device of the present invention. Initially only the faceplate 10 with its masking columns and back plate 20 are visible. The apertures can then be effectively covered to any desired degree by movements of the three movable plates on spring biased rollers 33a, 34a, and 35a shown in FIG. 3. Each first biased rollers correspond with first track rollers 33b, 34b, and 35b on track base plate 36. The band averaged emissivity of the face plate can be chosen either to match the emissivity of the three movable plates or it can match the emissivity of the back plate. It is understood that the relative thickness shown in FIG. 3 are not to scale and are for purposes of depicting a preferred embodiment only.

Figure 4:
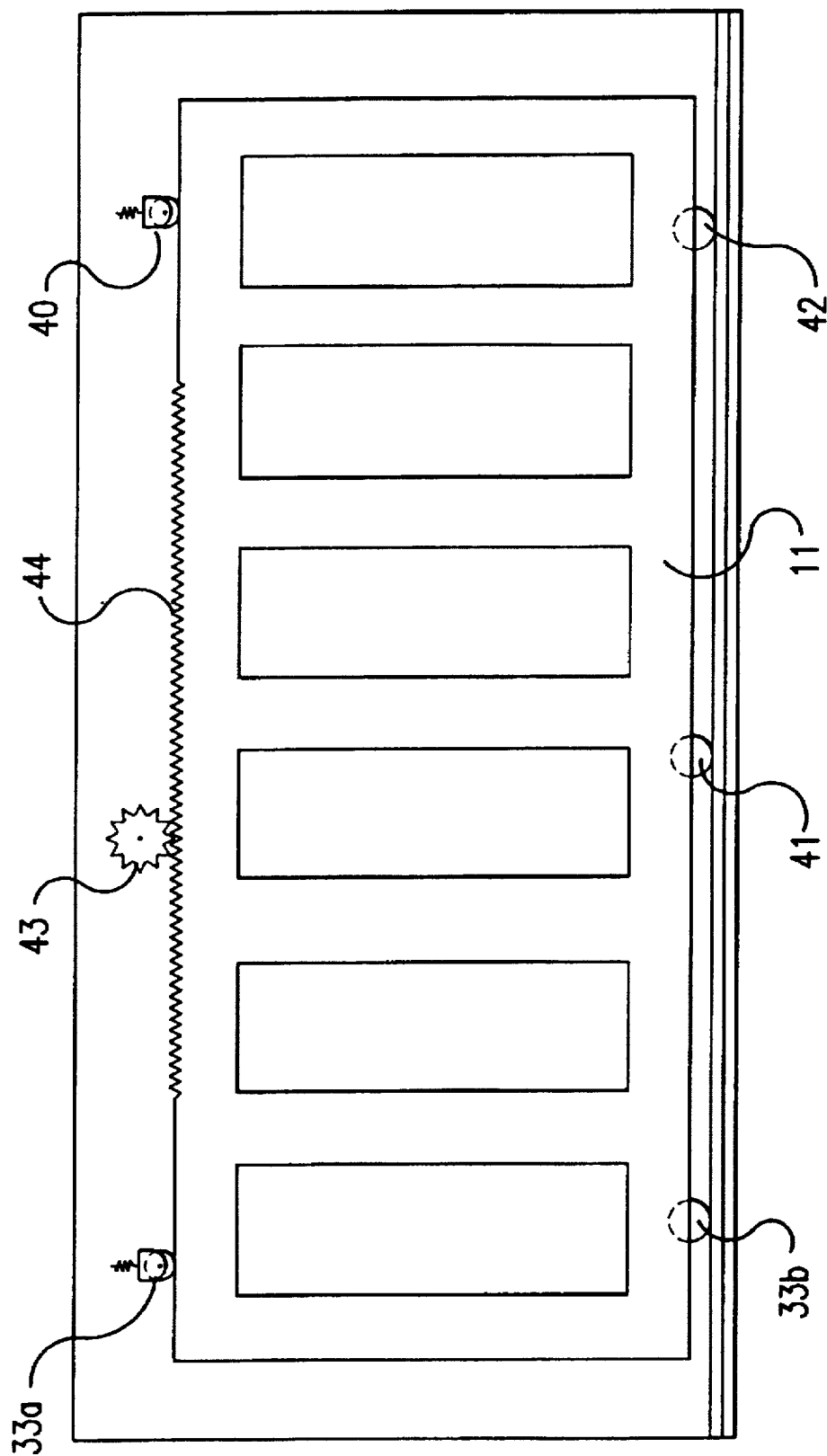
FIG. 4 is a front cutaway view of the apparatus of FIG. 3 illustrating the drive and track mechanism for the movable plate elements.

FIG. 4 is a front cutaway view of the apparatus of FIG. 3 illustrating the drive and track mechanism subassembly for the movable plate elements. Only one moveable plate is shown as present in FIG. 4. As seen in FIG. 4, movable plate 11 utilizes two biased rollers, first biased roller 33a and second biased roller 40. Three track rollers, first track roller 33b along with second and third track rollers 41 and 42 also provide for allowing plate 11 to roll along a fixed track. Gear 43 in contact with surface 44 drives plate 11 to control the amount of aperture in plate 10 that is filled with plate 11.

Figure 5:
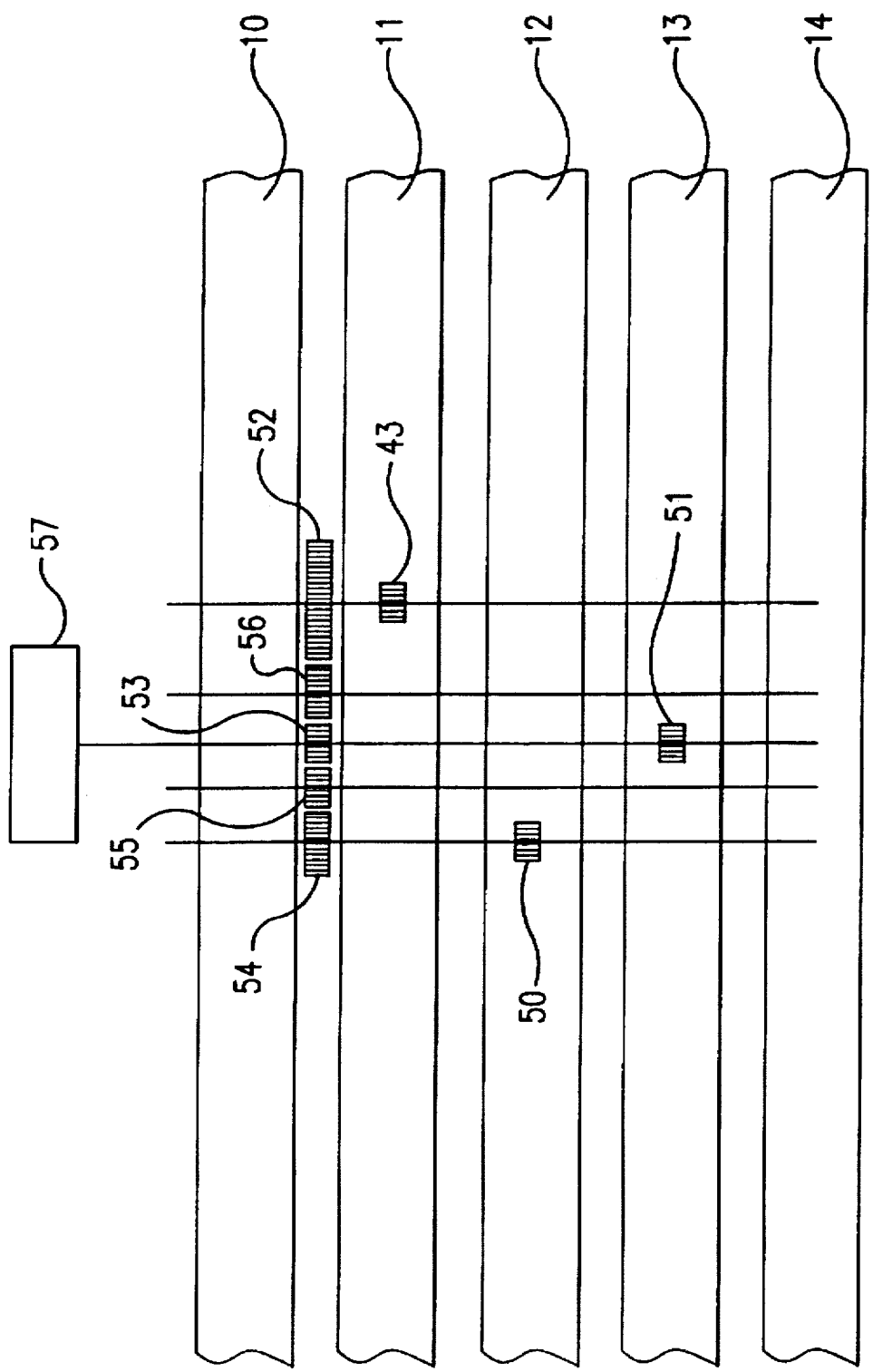
FIG. 5 is a top cutaway view of the apparatus of FIG. 3 illustrating the gear drive mechanism for moving the plates.

FIG. 5 is a top cutaway view of the apparatus of FIG. 3 illustrating the movement means for moving the plates. The gear mechanism shown in FIG. 5 allows for relative movements between each of the three movable plates 11, 12, and 13. Each of moveable plates 11, 12 and 13 utilize corresponding gears 50, 51 and 43 which move along corresponding surfaces similar to that described in FIG. 4. Each of gears 43, 50, and 51 are coupled to corresponding sized gears 52, 53, and 54 which are correctly sized to cooperate with reversing gears 55 and 56 so as to all be driven by motor 57 in increments as desired. All gears shown in FIG. 5 are also correctly sized such that plate 12 will travel twice the speed of plate 11, and plate 13 will travel with three times the speed of plate 11. This assures that each movable plate covers its appropriate portion of the aperture plate 10. It is understood that the invention is not limited to the specific movement means disclosed. Other movement means such as with pulses and stepping motors may be utilized.

Additional moving plates for the apparatus could be utilized which would therefore allow the emissivity to be controlled over a larger range of values (i.e. change the number of movable plates from three to m). Another way to allow the emissivity to be controlled over a larger range would be to cover the vertical masking columns in FIG. 1a by smaller versions of the device. By doing this n times a device with greater capability is obtained at the cost of complexity associated with larger values of n. In the infrared, there are at least three separate methods for choosing the emissivities of the m sets of plates and in choosing the fractional area for each plate:

a) The emissivities $\epsilon 1$ can be chosen to be as close to zero as is practicable and $\epsilon 2$ can be chosen to be as close to 1 as is practicable. Then with either m or n large enough the band averaged emissivity can be controlled between values that approach zero and one.

b) Each set of m plates can have a band averaged emissivity designed to match the spatial pattern of a particular background and then at the user's choice any set of the plates can individually cover the aperture. With this method, at the user's will, the surface emissivity spatial pattern will match as many backgrounds as there are sets of plates, and c) Each set of m plates can have a spectral emissivity designed to match that of a particular background and at the user's choice any weighted combination of the n sets can cover the aperture. This allows the user to select a spectral emissivity which is an arbitrary linear combination of the spectral emissivities that occur in nature.

Suppose that emissivity $\epsilon 1$ of the movable plates is approximately zero, that the emissivity $\epsilon 2$ of the back plate is approximately 1 and that the face plate has emissivity $\epsilon 1$. Neglecting edge effects, with this choice, by appropriately positioning the movable plates the band averaged apparent emissivity of the surface can be controlled between 0 and ¾. If the emissivity of the face plate is chosen to have emissivity $\epsilon 2$ then neglecting edge effects the apparent emissivity of the surface can be controlled between ¼ and 1. One could allow the apparent emissivity of the surface to vary over a still greater range by increasing the number of movable plates or by repeatedly partially covering the masking columns in FIG. 1a.

In the visible there are at least two different methods for choosing sets of m plates:

a. To control the apparent hue, saturation and lightness the first set of plates has a saturated red color, the second set of plates have a saturated green color, the third set of plates has a saturated magenta color, the fourth set of plates are white and the fifth set of plates is black. By appropriately choosing the amount of red, green, magenta, white and black displayed in the aperture of the first stationary plate (at ranges great enough so that the individual plates cannot be resolved) the hue, saturation and lightness of the surface can be controlled. The appropriate weighting coefficients for the areas of the five sets of areas may be obtained by using a known reference such as: a CIE chromaticity diagram disclosed in "Handbook of Optics" edited by Driscoll et al (Optical Society of America; McGraw-Hill; 1978)

b) Each set of m plates can have a camouflage pattern painted on it to match the spatial color pattern of a particular background. With this method the user can in real-time choose amongst as many camouflage patterns as there are sets of plates.

The device described in a, for the visible, allows the user to control the visible appearance of a surface over a broad range of hues, saturation and lightness using only reflected light. By increasing the number of plates to a larger value and by introducing other hues besides red, green and magenta it is expected that the visible appearance of a surface can be controlled over an even broader range of values. By making the device described in either a or b, for the visible, small and using many of them, textures and two dimensional images of objects can be passively produced. Because the image is produced by reflected light, (power is only needed to change, not to maintain the image) these textures or images can be changed with little power, require no power to maintain and can be seen in daylight even under bright illumination. Because the invention allows the emissivity, color or camouflage pattern to be maintained indefinitely without the use of power, the device is described as passive.

The device of the invention allows for control in the visible spectrum of: the hue, saturation and lightness of a surface. To control these attributes, a basic set of surfaces with the desired spectral reflectivities (red, green, magenta, white and black) is chosen. By appropriately controlling the relative area of the red, green and magenta surfaces, at ranges sufficiently large that the individual areas are not resolved by the human observer, the apparent hue (color) of the surface is controlled. By controlling the relative area of the white surface the apparent saturation is controlled. By controlling the relative amount of the black surface, the apparent lightness of the surface is controlled. For the embodiment shown in FIG. 3 this requires three movable plates for each color and requires fifteen movable plates in all. Note that the invention allows each set of three movable plates to fill an aperture. Thus the embodiment of FIG. 3 with fifteen movable plates would provide a capability of providing at least five different camouflage patterns which could be controlled in real-time.

In the working example for the first embodiment, the dimensions for the framework assembly, surface heights and widths for all surfaces utilized are preferredly determined such that at least 50% or more of the target's surface area which is visible from a viewing position is "treated". The definition of "treated" for the purposes of this invention in any visible area (or associated area) of the target which interacts with the technique or device of the present invention. The movable plates are made of thin sheets of plastic, which allows for a great many plates while keeping the device light and allows for a capability to quickly control emissivity over a large range of values or allows the user to choose amongst several camouflage patterns. If the movable surfaces can be made out of armor plate, fewer plates would be used and the device would be heavier. If armor plate is utilized, the device of the present invention may be coupled to the target surface thus protection against damage (such as small arms fire) is achieved. The high emissivity surface can be obtained by utilizing: matte black lacquer $\epsilon=0.97$; candle soot $\epsilon=0.98$; graphite $\epsilon=0.94$. The low emissivity surface can be obtained by utilizing: polished aluminum $\epsilon=0.05$; polished or electro-plated nickel $\epsilon=0.05$; tin plated sheet iron $\epsilon=0.07$. The number of moving plates m is 3, and the ratio $w_a/w_m$ is 3. The $w_a$ is equal to three centimeters and $\theta$ is one milliradian which results in $R_0$ as 30 meters. At 30 meters the width of the aperture and masking columns would be unresolved and the device is expected to work at ranges greater than this. The mechanical movement of plates determines the response time for the first embodiment of the invention. Depending on the size of the aperture, the number of apertures in a movable plate, the weight of a plate and the power of the motor which moves the plates, the response time of the device is between 0.1 and 2 sec. The expected range at which a target can be found with a probability of 50% may be expected to be reduced by a factor of between 2 and 3.

The current invention finds application to sensors that operate in the visible and the infrared part of the spectrum. The invention is expected to be most effective at ranges which exceed the critical range $R_0$. The camouflage patterns can in real-time be changed to match the background for different target aspect angles. The incremental advantage of being able to choose from a variety of camouflage patterns and to control them with target aspect angle will be most useful in places where the nature of the terrain changes rapidly with observer viewing angle, where the nature of the terrain changes rapidly with distance traveled by the vehicle or where the terrain changes rapidly with time (i.e. it starts to snow) and no single camouflage pattern is best.

An ability to control the emissivity of a surface implies an ability to control the surface temperature sensed by a FLIR. Let Tg denote the physical temperature of the ground assumed to be a black body, Ts denotes the physical temperature of the apparatus and $\epsilon_s$ the emissivity of the surface given by equation. (1). Assume that the geometry of the FLIR and the viewed surface are such that if the surface were perfectly reflecting that the FLIR would see an image of the earth. Then in the absence of an absorbing atmosphere, the temperature Tf sensed by the FLIR as it looks at the surface is given by:

$$Tf = \epsilon_s Ts + (1-\epsilon_s)Tg \qquad (2)$$

Note that if $\epsilon_s=1$ then the temperature sensed by the FLIR is the physical temperature of the emitting surface and if $\epsilon_s=0$ then the temperature sensed by the FLIR is Tg. In this invention emissivities $\epsilon 1$ and $\epsilon 2$ of the surfaces are chosen and the ratio A2/A1 is mechanically varied thereby varying the band averaged emissivity. By choosing surfaces with spectral emissivities $\epsilon 1(\lambda)$ and $\epsilon 2(\lambda)$ and by mechanically varying the ratio A2/A1 the spectral emissivity, also given by Equation (1), is effectively controlled. In the second embodiment, the directional dependence of $\epsilon$ as a function of observer viewing angle is controlled by employing movable vanes. This enables a target to blend into the background even if the background behind the target has a different spatial pattern for observers positioned at different azimuthal angles.

Figure 6:
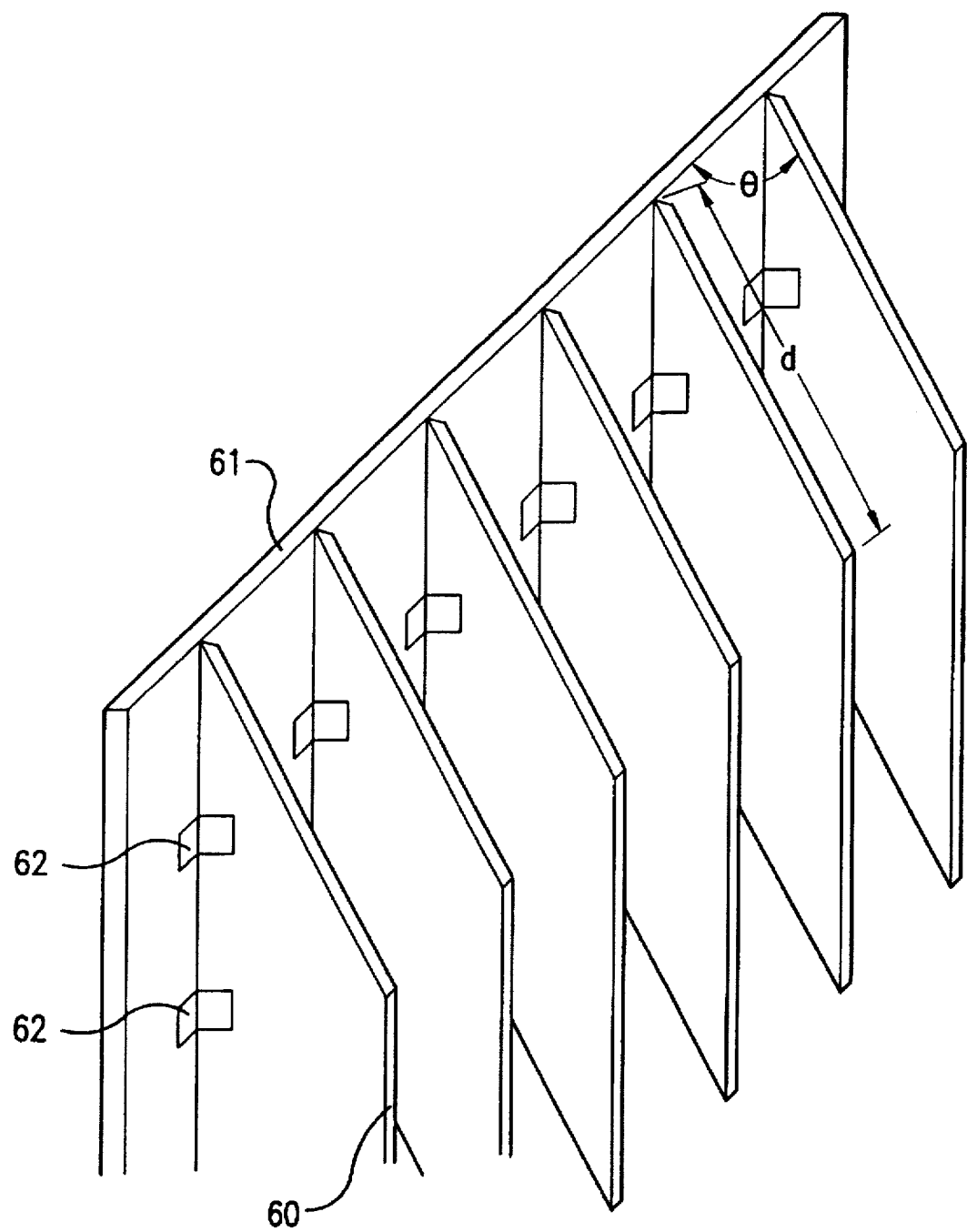
FIG. 6 is an oblique view of the camouflage surface-vane element utilized in the second embodiment of the invention.

FIG. 6 is an oblique view of the camouflage surface-vane element utilized in the second embodiment of the invention. All vanes, such as vane 60 shown in FIG. 6, are to be parallel to each other and each movably coupled to plate 61 by suitable hinge means. The main reason this is done is that it allows observers viewing the same surface from different directions to see different spatial patterns and the spatial pattern seen by each observer can be individually matched to the background seen by that observer. This capability derives from the observation that depending on the location of the observer and the angle of the vanes, the observer will see the face plate 70, of FIG. 7, or one of the two sides of the vanes 60, of FIG. 6. Utilizing fins also effect some convective cooling without forced air flow and because convective cooling is increased, the radiant signal seen by a thermal imager is decreased.

Figure 7:
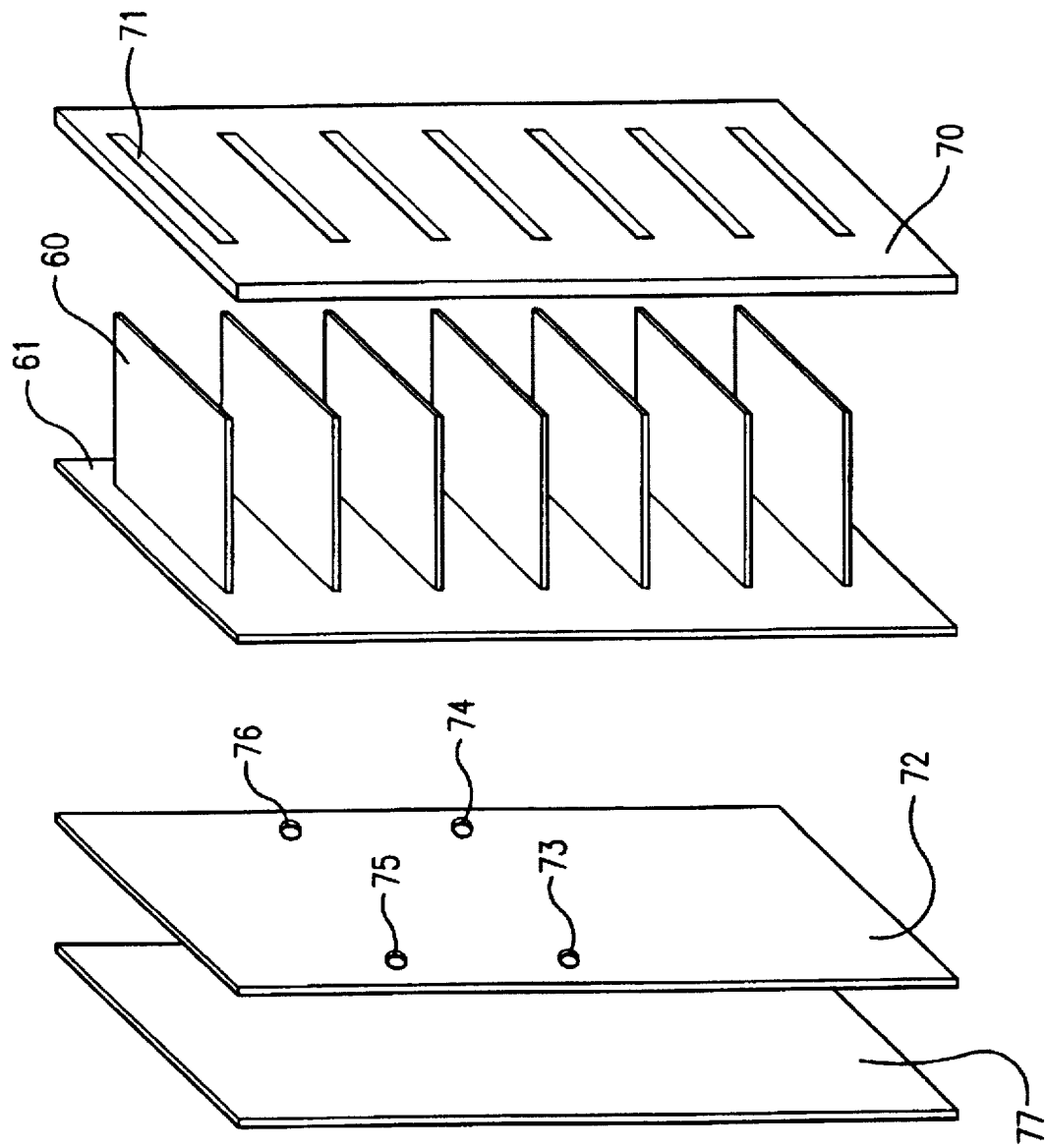
FIG. 7 is an oblique exploded view of the apparatus of the second embodiment utilizing the camouflage surface-vane element of FIG. 6.

FIG. 7 is an oblique exploded view of the apparatus of the second embodiment utilizing the surface-vane element of FIG. 6, and FIGS. 8a, 8b, and 8c are front views showing the movement means utilized in this embodiment for changing the parameters d and θ shown in FIG. 6. Face plate 70 of FIG. 7 includes slits 71 and plate 72 which is moved forward or backwards by wormed shafts 73, 74, 75, and 76 which all rotate in unison. The forward and backward motion of plate 72 determines the parameter d (how far vanes 60 will protrude outward from face plate 70).

In the visible, the second embodiment effects a surface whose camouflage pattern or color (hue, saturation and lightness) can be independently controlled so that each observer (the main threat, observer to left of main threat and observer to right of main threat) finds that the surface blends into the background. In the infrared, there is effected a surface such that the directional dependence of its camouflage pattern, emissivity (or spectral emissivity) can be controlled so as to make a surface that matches that of the background for observers looking at the surface from different directions. The fins allow for convective heat loss without forced air flow so that the physical temperature rises only a small amount when the emissivity is decreased.

The front surface of the face plate 70 and both sides of the vanes 60 are covered with a surface with attributes selected by the designer:

a) the surfaces can be the variable broad band or spectral emissivity surfaces described in the first embodiment of the invention, b) the surfaces can be the real-time selectable camouflage patterns described in the first embodiment of the invention, and c) the surfaces can be the real-time selectable color (hue, saturation, lightness) described in the first embodiment of the invention.

In general the vanes are pointed in the direction of the observer for whom a perfect match is desired. Normally this will be the main threat. If the designer selected option a) for the front surface 70 then the emissivity and the tilt of surface 70 would be chosen so that the combination of emitted and reflected radiation seen by the main threats thermal sensors would match the thermal background seen by those sensors. If the designer selected option b) for the front surface, then the camouflage pattern for the front surface would be chosen to match the visible background seen by the main threat. If the designer selected option c) for the front surface, then the color (hue, saturation, lightness) would be chosen to match the color of the background spatial pattern seen by the main threat.

Similarly, the vanes enable the surface to either match the emissivity, the camouflage pattern or the color for observers either to the left or right of the main threat. The parameter d determines the angle subtended at the camouflaged surface for the likely locations of the main threat and is controllable. The parameter θ (angle which the vanes make with the front surface 70) which is controllable, enables only the front surface of plate 70 to be visible to the main threat as the surface changes its aspect angle while observers to the right and left of the main threat see the outer and inner surfaces of the vanes. These vane surfaces can match the background seen by the observers to the left or right of the main threat by using methods a, b or c described above.

Figure 8A:
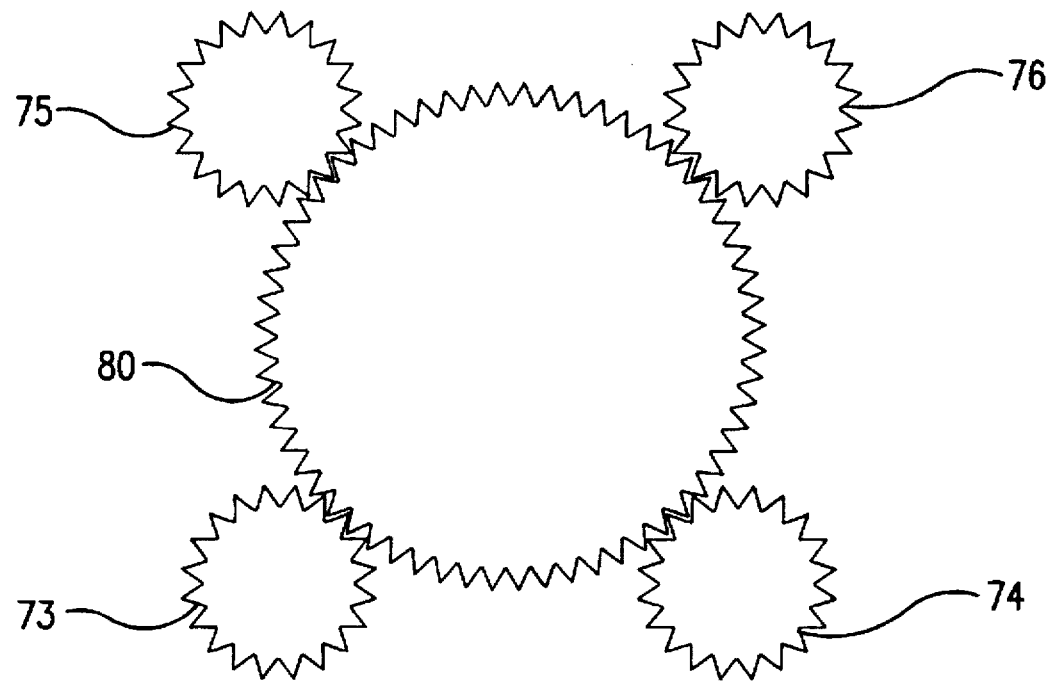
Figure 8B:
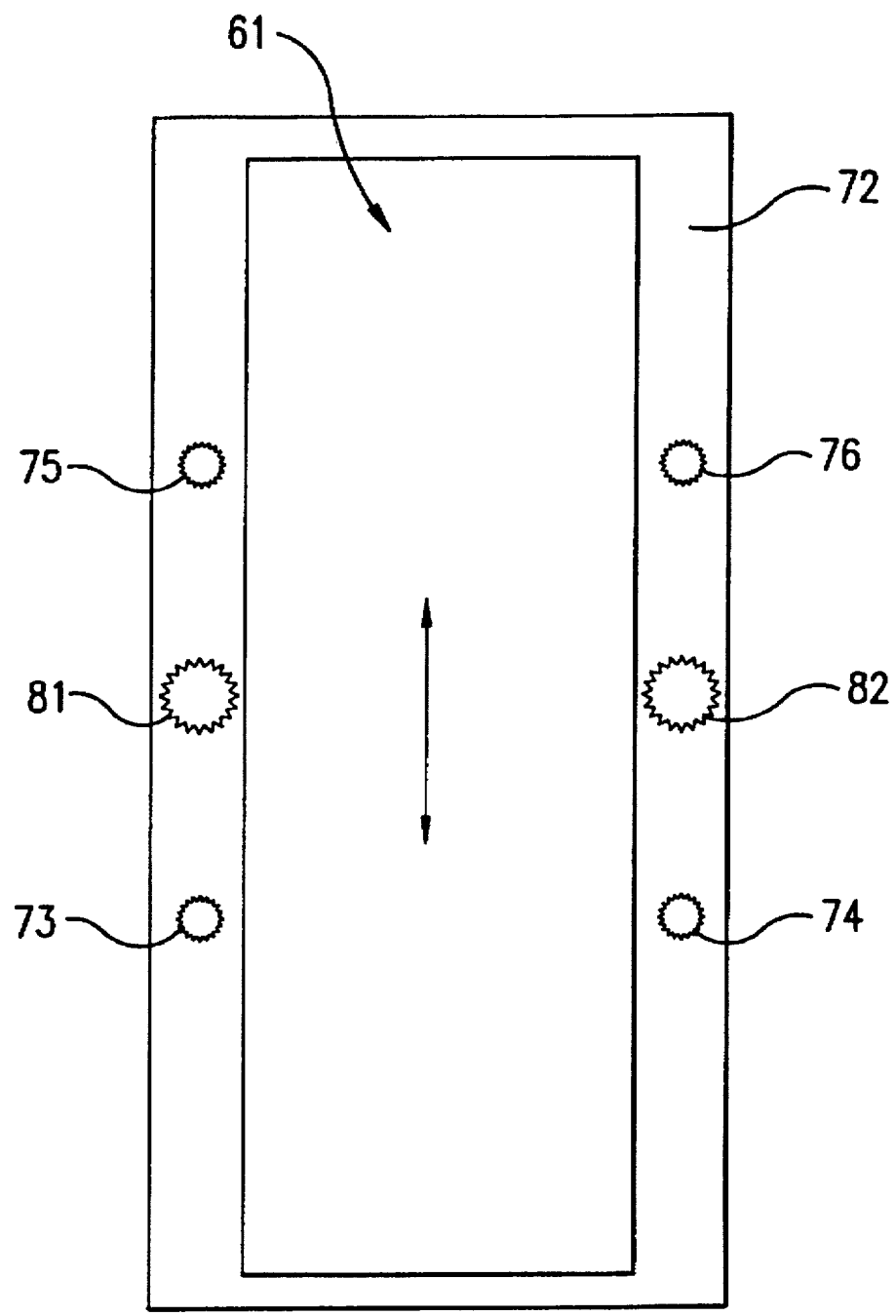
Figure 8C:
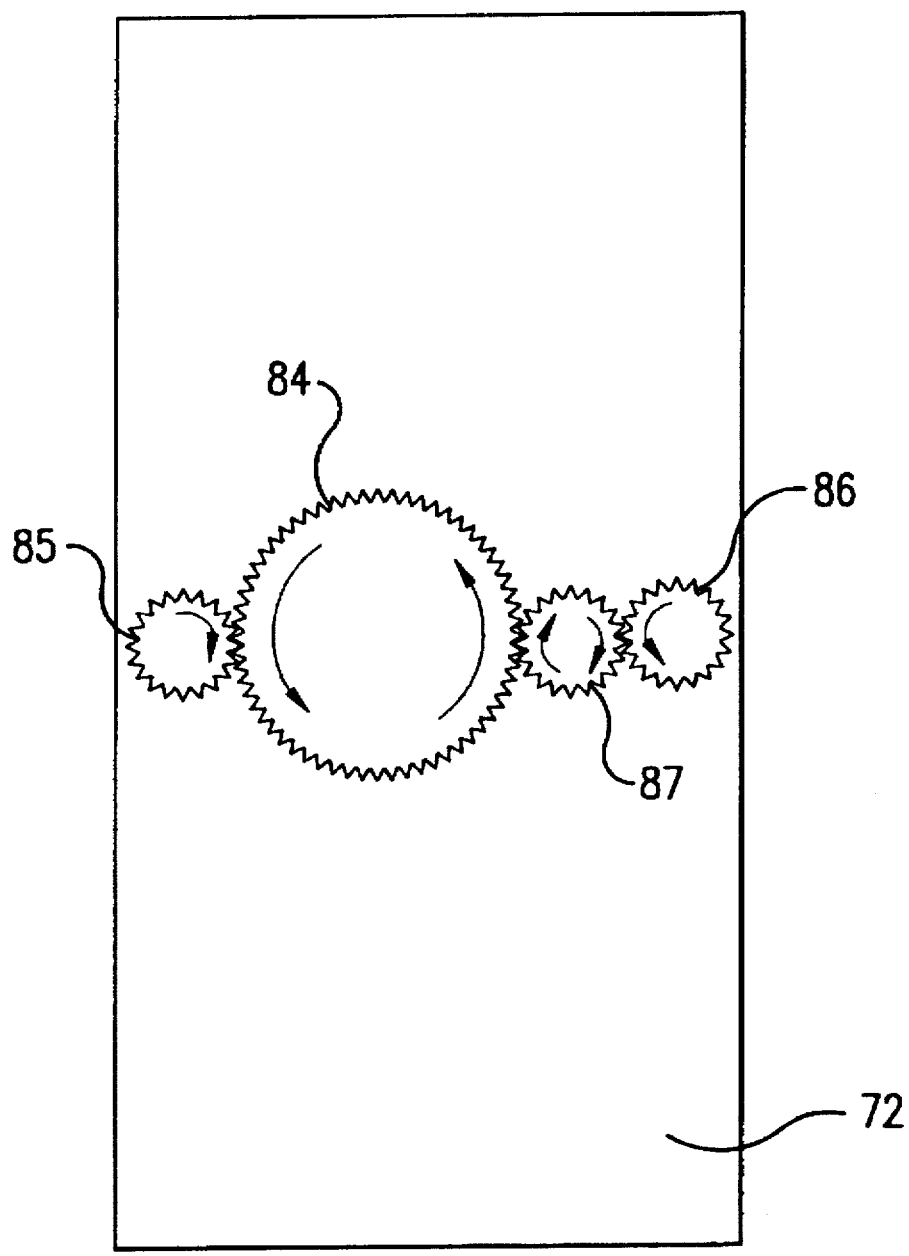

FIG. 8a shows the drive mechanism attached to plate 77 of FIG. 7. The drive mechanism including drive gear 80 of FIG. 8a drives the four wormed shafts which permits plates 72 and 61 to move toward or away from plate 70 and allows the parameter d to be varied. FIG. 8b shows plate 61 which is mounted on plate 72 and which is made to go up and down on plate 72 by driving gears 81 and 82. The upward and downward motion of plate 61 relative to plate 72 allows the angle θ of FIG. 6 to be controlled independently of d. Vanes 60 go through slits 71 in the face plate 70 shown in FIG. 7. To summarize, the forward motion of plate 72 determines how far out vanes 60 are relative to face plate 70 (control parameter d) and the tangential motion of plate 61 relative to plate 70 allows for control of the angle θ. FIG. 8c shows the mechanism which causes gears 81 and 82 of plate 61 to turn. Mounted on the back of plate 72 is motor gear 84 which is attached to the shaft of a motor. The motion of the motor gear 84 drives first axle gear 85 directly and drives second axle gear 86 through reversing gear 87 so that the two driving gears shown in FIG. 8c rotate in the proper direction.

In the working example for the second embodiment, the dimensions for the framework assembly, surface heights and widths for all surfaces utilized are again preferredly determined such that at least 50% or more of the target's surface area which is visible from a viewing position is "treated". The vanes and movable plates would probably be made of aluminum or plastic, however for a tank, these items could be made of thin armor plate if additional protection against shaped charges is desired. A few different approaches can be used to coat the inner and outer surfaces of the vanes and front surfaces 70 shown in FIGS. 6 and 7: 1) in the visible the surfaces can be coated with a variety of controllable camouflage patterns using the first embodiment of the invention; 2) in the visible the surfaces can be variable color (hue, saturation, brightness) using the first embodiment of the invention; 3) in the infrared the surfaces can be variable emissivity or variable spectral emissivity surfaces using the first embodiment of the invention; 4) in the infrared the surfaces can be coated with a variety of controllable camouflage patterns using the first embodiment of the invention.

The second embodiment involves mechanically changing the d and θ parameters. It is expected that these will only need to be changed in small increments as the vehicle maneuvers and that these small changes can be effected in nominally 0.1 sec. The expected range at which a target can be found with a probability of 50% may be expected to be again reduced by a factor of between 2 and 3.

The device and technique of the invention for both disclosed embodiments are to be used against many different viewing means such as: the naked eye, monocular aided eye, binocular aided eye, image intensifiers, television cameras with telescopic optics, cameras that utilize film, or staring and scanning thermal imagers operating in the 8–12, 3–5 or 0.7–2.5 micron bands. It is understood that the above list is not to limit the invention but shown only to describe different types of viewing means.

While this invention has been described in terms of preferred embodiment consisting of the device and technique described, those skilled in the art will recognize that the invention can be practiced with modification within the spirit and scope of the appended claims.

Having thus described my invention, what I claim as new and desire to secure by Letters Patent is as follows:

1. A technique for passive real-time control of effective emissivity, color, and camouflage, the technique utilizing effected surfaces of at least one assembly, interposed between a target and an observer having a predetermined angular resolution between target and observer, the technique comprising the steps of:

determining effective dimensions for all effected surfaces of the at least one assembly, the effected surfaces interposed substantially parallel to, and interposed between the target and the observe;

determining a critical range, as a range beyond which there is no resolution of individual effected surfaces as seen by the observer;

choosing at least one surface characteristic for each effected surface;

determining a number of movable effected surfaces to be utilized for the chosen surface characteristics;

applying the surface characteristics to each effected surface;

containing all effected surfaces relative to each other, as an assembly of masking columns and apertures, such that at least one effected surface is seen by the observer as relatively stationary, and at least one effected movable surface is movable at a predetermined rate, determining the number of assemblies, as a determined number of assemblies, to be utilized for the target whereby for beyond a critical range there is achieved, by positioning the determined number of assemblies, passive control of effective emissivity of a viewable surface in a thermal wavelength region, apparent color of a viewable surface in the visible wavelength region, and camouflage patterns for both thermal and visible wavelength regions.

2. The technique of claim 1 wherein the choosing of at least one surface characteristic for each effected surface further include the step of:

choosing an emissivity for each effected surface.

3. The technique of claim 1 wherein the choosing of at least one surface characteristic for each effected surface further include the step of:

choosing surface colors for each effected surface.

4. The technique of claim 1 wherein the choosing of at least one surface characteristic for each effected surface further include the step of:

choosing camouflage patterns for each effected surface.

5. The technique of claim 1 wherein the choosing of at least one surface characteristic for each effected surface further include the step of:

choosing spectral emissivity patterns for each effected surfaces.

6. Technique of claim 1 wherein there is a further step of:

controlling a directional dependence of effective emissivity as a function of observer viewing angle by movement of at least one moveable effected surfaces.

7. The technique of claim 1 wherein the determining effective dimensions for all effected surfaces of the at least one assembly further include the steps of:

determining aperture width and masking column width for each effected surface.

8. The technique of claim 7 wherein the determining a critical range, as a range beyond which there is no resolution of individual effected surfaces as seen by the observer, further includes the steps of:

dividing the aperture width by an instantaneous field of view.

9. The technique of claim 1 wherein the choosing of at least one surface characteristic for each effected surface further include the steps of:

choosing an emissivity for the movable effective surfaces that is approximately zero, and an emissivity of the relatively stationary effective surface as approximately one.

10. The technique of claim 1 wherein the choosing of at least one surface characteristic for each effected surface further include the steps of:

choosing an emissivity for the movable effective surfaces that is approximately one, and an emissivity of the relatively stationary effective surface as approximately zero.

11. The technique of claim 1 wherein the choosing of at least one surface characteristic for each effected surface further include the steps of:

choosing spectral emissivities for each movable effected surface which match the spectral emissivities of objects found in a background.

12. A device for passive real-time control of effective emissivity, color, and camouflage, the device utilizing effected surfaces which are interposed between a target and an observer having a predetermined angular resolution between target and observer, comprising:

at least one stationary effected surface, interposed between and substantially parallel to the observer and the target, the at least one stationary effected surface having a predetermined surface characteristic;

at least one set of movable effected surfaces, each set including at least one movable effected surface, each movable effected surface having a predetermined surface characteristic;

means for containing all effected surfaces relative to each other;

means for moving the movable surfaces with respect to each other in a predetermined rate, contained within the means for containing, whereby for beyond a critical range there is achieved, utilizing at least one of the devices, the passive control of effective emissivity of a viewable surface in a thermal wavelength region, apparent color of a viewable surface in the visible wavelength region, and camouflage patterns for both thermal and visible wavelength regions.

13. The device of claim 12 wherein the predetermined surface characteristic is a surface that has a predetermined surface emissivity.

14. The device of claim 12 wherein the predetermined surface characteristic is a surface that has a predetermined surface color.

15. The device of claim 12 wherein the predetermined surface characteristic is a surface that has a predetermined camouflage pattern.

16. The device of claim 12 wherein the predetermined surface characteristic is a surface that has a predetermined spectral emissivity.

17. The device of claim 12 wherein the at least one set of movable effected surfaces include movable surfaces that are apertured plates.

18. The device of claim 13 wherein the at least one set of movable effected surfaces includes movable surfaces that are vanes.

* * * * *